United States Patent

[11] 3,609,517

| | | |
|---|---|---|
| [72] | Inventor | Francis P. Tucker<br>Lynchburg, Va. |
| [21] | Appl. No. | 18,516 |
| [22] | Filed | Mar. 11, 1970 |
| [45] | Patented | Sept. 28, 1971 |
| [73] | Assignee | General Electric Company |

[54] LINE VOLTAGE COMPENSATING POWER CONTROL CIRCUIT
17 Claims, 5 Drawing Figs.

[52] U.S. Cl.............................................. 323/16,
307/252 B, 307/252 N, 307/252 T, 323/24, 323/36
[51] Int. Cl.............................................. G05f 3/04
[50] Field of Search................................. 307/252 B,
252 N, 252 T; 323/16, 19, 225 CR, 24, 36

[56] References Cited
UNITED STATES PATENTS

| 3,436,562 | 4/1969 | Harris, Jr.............. | 307/252 |
| 3,493,848 | 2/1970 | Galloway................. | 323/36 |

OTHER REFERENCES
General Electric SCR Manual, 4th Edition, 1967, pg. 189 relied on. TK2798.G4g

*Primary Examiner*—A. D. Pellinen
*Attorneys*—Robert J. Mooney, Nathan J. Cornfeld, Carl O. Thomas, Frank L. Neuhauser, Oscar B. Waddell and Joseph B. Forman

ABSTRACT: A circuit capable of controlling power application to a load while simultaneously reducing variations in line voltage employs a triac controlled by an SBS as a line switch. A potential divider and a diac referenced to opposite terminals of the SBS delay triac firing in response to line voltage increase. A resistor and capacitor attached to the triac gate protect the triac from inadvertent triggering.

PATENTED SEP 28 1971　　　　　　　　　　　　　　　3,609,517
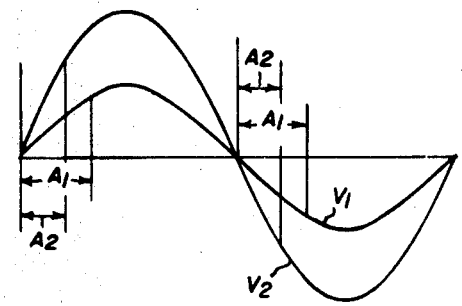
FIG.1.
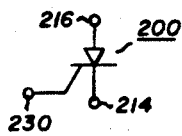
FIG.3.
FIG.2.
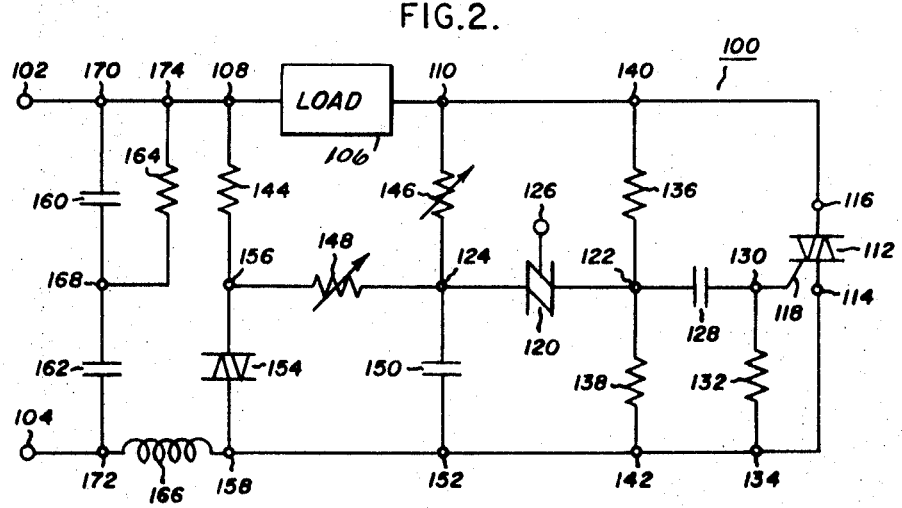
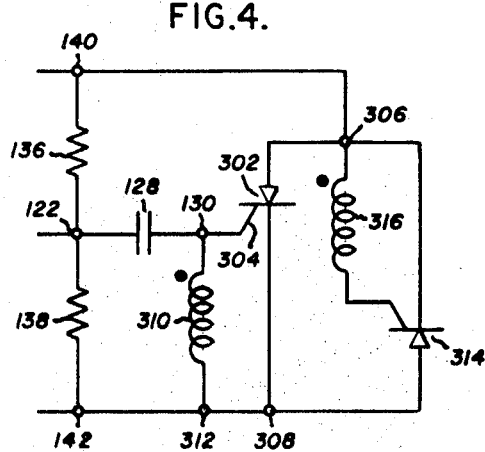
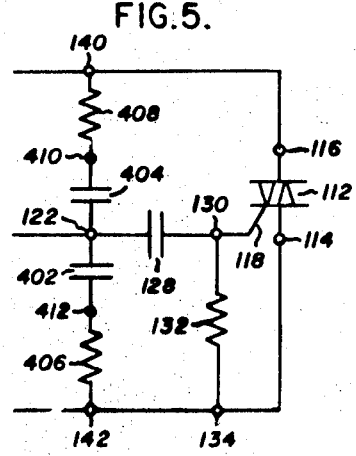
INVENTOR:
FRANCIS P. TUCKER,
BY Carl O. Thomas
HIS ATTORNEY.

LINE VOLTAGE COMPENSATING POWER CONTROL CIRCUIT

My invention relates to a circuit capable of controlling power application to a line load while simultaneously reducing variations in the load applied voltage attributable to variations in line voltage.

It is well understood by those skilled in the art that the power applied to a load in an AC circuit can be effectively controlled if a triggered semiconductor switching device is connected in series with the load. Prior to triggering the semiconductor switching device maintains a substantially open circuit condition. If a signal is applied to a firing terminal or gate of the device, it is switched to a highly conductive state and continues to conduct for the balance of the half cycle of the alternating current. The switching device inherently returns to a nonconducting condition when the current drops to zero or reverses. Control of power supplied to the load is achieved by controlling the phase angle or delay time which elapses during a half cycle between the application of a potential difference across the switching device and the firing signal. The firing signal is controlled by a symmetrical triggering device which fires in response to a predetermined potential difference thereacross. Typically an RC network may be utilized to provide a time constant for firing the symmetrical triggering device. By varying the value of the resistance in the RC network the rate of capacitor charging is controlled as well as the timed phase relation with which the triggering and switching devices are fired.

Thus, by choosing a potentiometer setting the timed phase relation of firing and the power input to the load is set. This, however, assumes that the line voltage remains constant. When the line voltage increases the time to charge the capacitor in the RC network decreases which in turn decreases the phase angle of firing. The combination of earlier firing during each half cycle and a larger applied line voltage produces an increase in load voltage which is disproportionately larger than the variation in line voltage.

This can be graphically seen by reference to FIG. 1. When a line voltage is available corresponding to curve $V_1$, a circuit may be adjusted to delay firing of the switching device during each half cycle corresponding to phase angle $A_1$. When the line voltage increases, as indicated by curve $V_2$, the phase angle for firing during each half cycle is reduced to a value $A_2$. It can be seen that the area beneath the voltage curve $V_2$ after firing is increased over the area beneath the voltage curve $V_1$ after firing not only by the increase in voltage amplitude, but also by the decrease in the phase angle. For example in a typical control circuit I have observed a 10 percent variation in line voltage to produce a 35 percent increase in load voltage. With the voltage and current in phase a similar variation in power supplied to the load is observed.

It is an object of my invention to provide a circuit for controlling power application to a load which reduces variations in the load applied voltage attributable to variations in line voltage.

This and other objects of my invention are accomplished in one aspect by providing a circuit comprised of a first electronic valve means connected in series with a line load capable of being switched from a high to a low impedance state and including gate control means. A second electronic valve means is provided including a terminal associated in signal conducting relation with the gate control means capable of being switched from a high to a low impedance state in response to a predetermined voltage differential thereacross. Means are provided for supplying the predetermined voltage differential to the second electronic valve means in timed phase relation to the line voltage. Further, means are provided for shifting the timed phase relation for switching the second electronic valve means in response to a variation in line voltage to reduce variation in the load applied voltage. This means includes means for referencing the terminal of the second electronic valve means to the voltage across the first electronic valve means in its high impedance state and means interposed between the voltage referencing means and the gate control means for minimizing line frequency current to the gate control means.

My invention may be better appreciated by reference to the following detailed description considered in conjunction with the drawings, in which, FIG. 1 is a full cycle plot of time as an abscissa versus voltage as an ordinate;

FIG. 2 is a diagram of a preferred embodiment of my inventive circuit;

FIG. 3 illustrates terminal connections to an SCR when substituted for the triac in the circuit of FIG. 2;

FIG. 4 is a detail of a modified form of the circuit of FIG. 2, in which a pair of SCR's in inverse parallel relation are substituted for the triac, and FIG. 5 is a detail of a modified form of the circuit of FIG. 2, in which an alternate potential divider is employed.

Noting FIG. 2, a circuit 100 is shown having input terminals 102 and 104 adapted to be connected to an alternating current power source. A load 106 is schematically shown provided with load terminals and 110. Load terminal 108 is conductively associated with input terminal 102. A triac 112 is connected in series with the load, having a first main terminal 114 conductively associated with the load terminal 104 and a second main terminal conductively associated with load terminal 110. The triac is provided with a gate lead 118.

A semiconductor or silicon bilateral switch (hereinafter, SBS) 120 is provided with a first main terminal 122, a second main terminal 124, and a gate terminal 126. The gate terminal of the SBS is not utilized and, as shown, is free of circuit interconnection. The first main terminal 122 is connected through line frequency isolation capacitor 128 to the gate lead at terminal 130. A bleed resistor 132 extends from the interconnection of the gate lead and isolation capacitor at 130 to a terminal 134 conductively associated with the first main terminal of the triac and the input terminal 104.

A potential divider is formed by resistors 136 and 138. The resistor 136 is conductively associated at terminal 140 with load terminal 110 and the second main triac terminal 116. The resistor 138 is conductively associated at terminal 142 with the first main triac terminal and the input terminal 104. The main terminal 122 of the SBS is connected to the potential divider mediate the resistors 136 and 138.

An RC charging network is formed by resistor 144, selectively variable resistors 146 and 148, and charging capacitor 150. The charging capacitor is connected between the second main terminal of the SBS and a terminal 152 conductively associated with the first main terminal of the triac and the input terminal 104. The variable resistor 146 is connected in series with the load between load terminal 110 and the second main terminal of the SBS while the resistor 144 and variable resistor 148 are connected in series with each other and in parallel with the load extending between load terminal 108 and the second main terminal of the SBS.

A diac 154 is provided with a terminal 156 mediate and shared with the resistors 144 and 148 and a terminal 158 conductively associated with the first main terminal of the triac and the input terminal 104. A radio frequency filter network is formed by filter capacitors 160 and 162, resistor 164, and choke 166. The capacitors 160 and 162 are connected in series with each other by mediate terminal 168 and are connected in shunt across the input terminals by terminal 170 conductively associated with input terminal 102 and load terminal 108 and terminal 172 conductively associated with input terminal 104 and the first main triac terminal. The resistor 164 is connected to terminal 168 mediate the filter capacitors and terminal 174 conductively associated with the load terminal 108 and the input terminal 102. The choke is located in series with the load and the triac and is shown between terminals 158 and 172.

In operation of the circuit 100, an AC power source is connected across the input terminals 102 and 104. Variable resistor 146 is set to provide maximum impedance and the variable resistor 148 is then set to a resistance level to provide a minimum power input level to the load. Thereafter the variable resistor 146 may be set at any level between its minimum and maximum impedance to selectively control the power input to the load.

With the variable resistors adjusted as desired, during any given half cycle of input voltage the triac 112 initially acts substantially to prevent current flow therethrough so that an open circuit condition exists. As the potential increases across the input terminals, the RC network which is in shunt with the triac charges the capacitor 150 through the resistors 144, 146, and 148 so that the terminal 124 approaches the potential of input terminal 102. The setting of the variable resistors 146 and 148, of course, regulates the capacitor charging rate.

At a given line voltage a predetermined level of capacitor charging creates a potential difference between the first main terminal 122 and the second main terminal 124 of the SBS which is sufficient to fire the SBS. The SBS in firing is switched from an initial, high impedance state which is essentially nonconductive to a low impedance state in which it provides only a very low impedance. In switching the SBS produces an instantaneous high frequency pulse which traverses isolation capacitor 128 and provides a trigger signal to gate lead 118 of the triac. This then switches the triac from its initial high impedance state to a low impedance state in which current is free to flow through the triac to the load. The filter capacitors 160 and 162, resistor 164, and choke 166 effectively prevent radio frequencies generated by the triac on switching from being transmitted to the line terminals.

Assuming the input voltage to be characterized by curve $V_1$, the delay between the time a potential difference develops across the input terminals and the firing of the triac during any given half cycle is schematically shown as phase angle $A_1$ in FIG. 1. If the circuit 100 where provided with only an SBS and RC network to control firing of the triac, increase of the input voltage amplitude to a value $V_2$ would decrease the phase angle to a value $AA_2$. This would cause line voltage to be dumped across the load earlier during each half cycle. Earlier voltage application together with a higher voltage amplitude would cause an increase in mean load voltage disproportionately greater than the increase in mean line voltage.

To reduce the adverse effect of line voltage increase on the phase angle for firing the triac, I utilize the resistors 136 and 138 as a potential divider to maintain the potential across terminals 122 and 140 at a fixed fraction of the potential across terminals 140 and 142. This functions to allow the first main terminal of the SBS to shift in potential in the direction of the shift of line potential. This delays achieving the necessary potential difference across the main terminals to cause firing of the SBS.

The ability to utilize a potential divider to regulate the potential of SBS main terminal 122 is not apparent, since it would appear that the potential divider would provide a parasitic current in shunt with the triac that could conceivably admit undersired triggering current to the gate lead. I remedy this difficulty by providing the isolation capacitor 128 between the gate lead and the SBS first main terminal associated with the potential divider. The isolation capacitor is chosen of a value so that it will not readily conduct line current frequencies, but will readily conduct the high frequency pulse generated by the SBS on firing. Further, I provide the resistor 132 so that any small increment of line current passed through the isolation capacitor can be partially bled to the first main terminal of the triac rather than being entirely conducted to the gate lead. The result is to reduce the signal potentially available to the gate lead of the triac from the potential divider to a point where triac triggering by the parasitic current of the potential divider is avoided.

The potential divider formed by resistors 136 and 138 reduces the effect of an increase in line voltage on the load, but it is not capable of entirely stabilizing the load voltage when the line voltage increases. To assist the potential divider in stabilizing the load voltage I utilize the diac 154. It can be readily seen that the diac and resistor 144 divide the line voltage between them. The resistor 144 may be chosen so that an increase in line voltage will result in a potential difference between terminals 156 and 158 of the diac sufficient to switch the diac from its initial, high impedance state to a low impedance state. It is to be noted, however, that the characteristic of a diac is such that it continues to offer a significant impedance even after firing. Accordingly, the diac shunts only a fraction of the current which is used to charge the capacitor 150. Further, the diac exhibits a negative resistance characteristic after firing. Accordingly, after the diac fires the resistance which it offers to further current flow decreases as its terminal applied voltage increases. Thus, the diac after firing delays charging of the capacitor 150 (and hence the application of the switching potential across the SBS) in direct relation to the increase in line voltage. The result is that the phase angle of firing in increased when the line voltage increases rather than being held constant or even reduced, as would otherwise occur.

It is a particular advantage of my invention that one of the variable resistors 146 is located in series with the load while the remaining variable resistor is located in parallel with the load. By placing the resistor 146 in series with the load the line voltage which is placed across the load after firing the triac is not reduced by the shunt current through this resistor. While the variable resistor 148 does allow some portion of the current to shunt the load and hence to dome extent reduces the value of the load applied voltage, it is to be noted that the variable resistor 148 is set to provide the maximum phase shift for triggering and hence normally exhibits a relatively high impedance setting. Another advantage attributable to placing the variable resistor in series with the load rather than across terminals 124 and 156, for example, is that the range of impedances obtainable by setting the variable resistor 146 is less affected by different settings of the variable resistor 148. This is attributable to the stabilizing effect of the load resistance which is in series with the variable resistor 146 and the resistor 144 which is in series with the variable resistor 148.

The triac, SBS, and diac all being symmetrical switching devices behave identically whether switching during a positive or negative half cycle. At the start of each half cycle these devices all revert to their initial high impedance state so that they may be repetitively switched in the manner described above. It is recognized that an SCR may be substituted in the circuit 100 for the triac, provided switching during only positive or only negative half cycles is acceptable. In FIG. 3, for example, an SCR 200 is shown having an anode terminal 216, cathode terminal 214, and gate terminal 230. The SCR 200 may be readily substituted for the triac 112 with the cathode terminal substituted for the first main terminal of the triac, the anode terminal substituted for the second main terminal of the triac, and the gate terminal substituted for gate lead terminal 130. Alternatively, the SCR could be mounted in the circuit with the positions of the anode and cathode terminals reversed.

The disadvantage of substituting an SCR for a triac is that the power available to the load is halved. In FIG. 4 an arrangement is shown whereby two SCR's may be substituted for the triac 112 so that power can be supplied to the load during both positive and negative half cycles. Except as specifically noted, the circuit of FIG. 4 may be identical to that of FIG. 2, like reference numerals being assigned to like elements and nonpertinent portions of the circuit being omitted entirely. A first SCR 302 is provided with a gate lead 304 connected to gate terminal 130. The anode of the SCR is connected to terminal 306, which is conductively associated with the load. The cathode of the SCR is connected to terminal 308, which is conductively associated with the line. The bleed resistor 132 of the circuit 100 is replaced by a transformer primary winding 310 connected between the gate terminal and a terminal 312 conductively associated with the cathode terminal and the line. A second SCR 314 is connected in inverse parallel relation with the first SCR, having its anode connected to terminal 308, its cathode connected to terminal 306, and its gate connected through the secondary winding of 316 of the transformer to the terminal 306.

Normally the isolation capacitor 128 prevents the potential divider provided by resistors 136 and 138 from providing a firing current to either the gate lead 304 or the transformer primary winding. A portion of the low level of current that is transmitted by the isolation capacitor can be bled through the transformer primary winding to insure that the first SCR does not fire. When the SBS is fired during a positive half cycle— that is, when the terminal 140 is positive with respect to terminal 142—a gate signal is provided to the first SCR through the gate lead 304. The gate signal also traverses the transformer secondary winding, but this does not actuate the second SCR 314, since it is reverse biased during the positive half cycle. The first SCR is, however, switched to its low impedance state for the balance of the positive half cycle. At the beginning of the following negative half cycle the first SCR reverts to its high impedance state. The next firing of the SBS produces a signal which is incorrectly poled to fire the now reverse biased first SCR, but which passes through the primary winding and generates a signal in the secondary winding to switch the second SCR to its low impedance state, the second SCR being forward biased during the negative half cycle. Thus, it can be seen that the two SCR's in inverse parallel together with the transformer windings provide a circuit function equivalent to that of the triac and resistor 132 in the circuit 100.

While a potential divider formed by resistors 136 and 138 is shown in FIG. 2 for referencing the potential of the first main terminal 122 of the SBS to the line, I recognize that a voltage divider could be provided as shown in FIG. 5. A first capacitor 402 references the terminal 142 to the terminal 122 while a second capacitor 404 references terminal 122 to the terminal 140. To protect against the capacitors forming the potential divider dumping a large surge current through the triac when it fires, resistor 408 is connected between first capacitor terminal 410 and terminal 140 while resistor 406 is connected between the second capacitor terminal 412 and the terminal 142. Portions of the circuit not specifically described or omitted from FIG. 5 may be identical to circuit 100.

While I have described my invention with reference to certain preferred embodiments, it is appreciated that numerous variations will readily occur to those skilled in the art. For example, while I prefer to utilize a triac to switch line power to the load, it is appreciated that any electronic valve means which is selectively actuated by a gate or control lead from an initial high impedance state to a low impedance state may be substituted. While I prefer to utilize an SBS for triggering the triac, it is appreciated that a diac may be substituted, provided it exhibits a lower breakdown voltage than the diac 154. I specifically contemplate the use of any electronic valve means in place of the SBS which may be switched from an initially high impedance state to a low impedance state in response to a predetermined potential difference across its terminals. I also contemplate that unilateral devices such as Shockley diodes connected in inverse relation may be substituted for the SBS. Also, semiconductor unilateral switches (SUS's) may be used in inverse parallel, provided each is placed in series with a diode. While I have described the use of a specific radio frequencies filter between the triac and the line, it is appreciated that any conventional filter could be substituted. Further, if it is desired to protect the load rather than the line from radio frequencies, the filter may be interposed between the triac and the load. It is also contemplated that a soft firing triac may be substituted which does not produce radio frequencies on firing. In this instance the filter is unnecessary. Where less than maximum line voltage compensation is required the diac may be omitted from the circuit, although inclusion is preferred. I also contemplate that a Zener diode may be substituted for the diac to reference terminal 156 to terminal 158, although a Zener diode would be less effective than a diac. For specific applications one of the variable resistors 146 and 148 may be omitted. The variable resistor 146 may in specific applications be replaced by a fixed resistor. The bleed resistor 132 may be omitted together with its function. For very sensitively gated triacs it may be desirable to replace the bleed resistor with a pulse transformer having its primary connected between terminals 130 and 134 and its secondary connected between the triac gate lead and terminal 114. Any conventional line frequency filter may be substituted for the isolation capacitor 128.

Inasmuch as still other circuit modifications will be obvious to those skilled in the art apprised of my invention, it is requested that the scope of my invention be determined by reference to the following claims.

I claim:

1. A circuit capable of controlling power application to a line load while simultaneously reducing variations in the load applied voltage attributable to variations in line voltage comprising first electronic valve means connected in series with the line load capable of being switched from a high to a low impedance state including gate control means, second electronic valve means including a terminal associated in signal conducting relation with said gate control means capable of being switched from a high to a low impedance state in response to a predetermined voltage differential thereacross, means for supplying the predetermined voltage differential to said second electronic valve means in timed phase relation to the line voltage, and means for shifting the timed phase relation for switching the second electronic valve means in response to a variation in line voltage to reduce variation in the load applied mean voltage including diac negative resistance means capable of selective actuation from an initially high impedance state by an increase in line voltage to provide a conductance path to delay supplying the predetermined voltage differential to the second electronic valve means, means for referencing said terminal of said second electronic valve means to the voltage across said first electronic valve means in its high impedance state, and means interposed between said voltage referencing means and said gate control means for minimizing line frequency current to said gate control means including means to divert current from said gate control means.

2. A circuit according to claim 1 in which said referencing means includes a potential divider connected in parallel with the first electronic valve means.

3. A circuit according to claim 1 in which said referencing means includes a pair of circuit impedance means connected in series to each other and in parallel to said first electronic valve means.

4. A circuit according to claim 1 in which said referencing means includes a pair of resistors connected in series to each other and in parallel to said first electronic valve means.

5. A circuit according to claim 1 in which said referencing means includes a pair of capacitors and a resistor connected in series to each other and in parallel to said first electronic valve means.

6. A circuit according to claim 1 in which said line frequency current minimizing means includes a capacitor interposed between said gate control means and said terminal of said second electronic valve means.

7. A circuit according to claim 1 in which said means for supplying the predetermined voltage differential to said second electronic valve means includes resistance means and capacitance means in series relation to each other and in parallel to said first electronic valve means 8. A circuit according to claim 7 in which said resistance means includes a first selectively variable resistance means conductively associated with the load at a terminal remote from said first electronic valve means and a second selectively variable resistance means conductively associated with the load mediate the load and said first electronic valve means.

9. A circuit according to claim 7 in which said resistance means includes a selectively variable resistance means conductively associated with the load mediate the load and said first electronic valve means.

10. A circuit according to claim 1 additionally including means for filtering out high frequencies generated by said first electronic valve means.

11. A circuit according to claim 1 in which said first electronic valve means is a triac.

12. A circuit according to claim 1 in which said first electronic valve means is comprised of a pair of semiconductor controlled rectifiers connected in inverse parallel relation.

13. A circuit according to claim 1 in which said first electronic valve means is a semiconductor controlled rectifier.

14. A circuit according to claim 1 in which said second electronic valve means is a semiconductor bilateral switch.

15. A circuit capable of controlling power application to a line load while simultaneously reducing variations in the load applied voltage attributable to variations in line voltage comprising a triac having first and second main terminals and a gate, said triac main terminals being connected in series with the load, a semiconductor bilateral switch having first and second main terminals, said first main terminal being associated in signal conducting relation with said gate, a potential divider connected in series with the load and in parallel with said triac and having a mediate connection to said first terminal of said semiconductor bilateral switch, a first capacitor interposed between said gate and said mediate connection of said potential divider, a resistor connected between said gate and said first main terminal of said triac, a second capacitor connected to said first main terminal of said triac and said second main terminal of said semiconductor bilateral switch, first resistance means connected to said second capacitor and said semiconductor bilateral switch in parallel with the load, second, variable resistance means connected to said second capacitor and said semiconductor bilateral switch in series with the load, and a diac connected to said first resistance means and said first major terminal of said triac.

16. A circuit according to claim 15 additionally including means for filtering out high frequencies generated by said triac.

17. A circuit according to claim 15 additionally including a third, variable resistance means interposed between said first resistance means and said semiconductor bilateral switch.